United States Patent [19]

Sasaki et al.

[11] Patent Number: 4,948,525

[45] Date of Patent: Aug. 14, 1990

[54] LUBRICATING OIL COMPOSITIONS FOR REFRIGERATORS

[75] Inventors: Umekichi Sasaki, Kawasaki; Hiroshi Hasegawa, Yokohama, both of Japan

[73] Assignee: Nippon Oil Co., Ltd., Tokyo, Japan

[21] Appl. No.: 331,443

[22] Filed: Mar. 31, 1989

[30] Foreign Application Priority Data

Apr. 6, 1988 [JP] Japan .................... 63-82983
Apr. 22, 1988 [JP] Japan .................... 63-98378

[51] Int. Cl.$^5$ .................................................. C09K 5/04
[52] U.S. Cl. ...................................... 252/52 A; 252/58; 252/68; 252/69
[58] Field of Search ................... 252/68, 69, 58, 52 A

[56] References Cited

U.S. PATENT DOCUMENTS

| | | | |
|---|---|---|---|
| 3,806,455 | 4/1974 | Siegart et al. | 252/58 |
| 4,072,027 | 2/1978 | Berenbaum et al. | 252/68 |
| 4,155,865 | 5/1979 | Ostrozynski et al. | 252/67 |
| 4,199,461 | 4/1980 | Olund | 252/68 |
| 4,428,854 | 1/1984 | Enjo et al. | 252/69 |
| 4,454,052 | 6/1984 | Shoji et al. | 252/68 |
| 4,557,850 | 12/1985 | Ando et al. | 252/69 |
| 4,699,726 | 10/1987 | Nolin et al. | 252/69 |
| 4,755,316 | 7/1988 | Magid et al. | 252/68 |
| 4,793,940 | 12/1988 | Borde et al. | 252/69 |

FOREIGN PATENT DOCUMENTS

| | | | |
|---|---|---|---|
| 201879 | 11/1983 | Japan | 252/68 |
| 84/01165 | 3/1984 | PCT Int'l Appl. | 252/69 |

*Primary Examiner*—Olik Chaudhuri
*Assistant Examiner*—E. McAvoy
*Attorney, Agent, or Firm*—Bucknam and Archer

[57] ABSTRACT

A lubricating oil composition for a refrigerator using therein 1,1,1,2-tetrafluoroethane as the refrigerant, comprising as the base oil a polyoxyalkylene glycol monoether of the following general formula $$R_1\text{+}OR_2\text{+}_m\text{—}OH$$

wherein $R_1$ is an alkyl group having 1–18 carbon atoms, m is an integer of 5–70, $R_2$ is an alkylene group having 2–4 carbon atoms and a ratio of 0–0.8 between (the number of —$OR_2$—group wherein $R_2$ is ethylene group)/m in the molecule, the polyoxyalkylene glycol monoether having a specified pour point and a specified kinematic viscosity. In one embodiment, the lubricating oil composition may further comprise a specified phosphate and at least one kind of a specified epoxy compound to further improve the oil composition in properties.

7 Claims, No Drawings

LUBRICATING OIL COMPOSITIONS FOR REFRIGERATORS

BACKGROUND OF THE INVENTION

1. Field of the Invention

This invention relates to a lubricating oil composition for a refrigerator in which 1,1,1,2-tetrafluoroethane (HFC-134a) is used as the refrigerant.

2. Prior Art

There have heretofore been used many kinds of refrigerators, among which so-called vapor compression type refrigerators using a refrigerant which are classified into reciprocating type, centrifugal type and rotary type refrigerators depending on the structure of compressor thereof. Of these various refrigerators, those having a rotary compressor are characterized in that they have high refrigeration performances for their small size, exhibit excellent performances even in the region of high-speed rotation and are run smoothly and quietly. Thus, the refrigerators having a rotary compressor are widely used in home refrigerators and air-conditioners as well as in car air-conditioners.

The lubricating oil compositions for refrigerators (hereinafter sometimes referred to as "refrigerator oil composition(s)") used in said refrigerators and conditioners, generally include naphthenic mineral oils, paraffinic mineral oils, alkylbenzenes, polyglycolic oils and mixtures thereof, which have each a kinematic viscosity of 5–200 cSt at 40° C. as well as these oils incorporated with suitable additives.

The refrigerants which are widely used for compression type refrigerators include halogen-containing refrigerants such as trichloromonofluoromethane (CFC-11), dichlorodifluoromethane (CFC-12), monochlorodifluoromethane (HCFC-22) and trichlorotrifluoroethane (CFC-113); hydrocarbon refrigerants typified by propane; and inorganic gas refrigerants typified by ammonia, carbonic acid gas and the like.

Of these refrigerants, the halogen-containing refrigerants are chemically stable, low poisonous and incombustible and have thermodynamically ideal characteristics; therefore, they are widely used in home refrigerators and air-conditioners as well as in car air-conditioners.

Of these halogen-containing refrigerants, however, perhalogenocarbon which is in the form of chloro-fluorocarbon obtained by substituting all the hydrogen atoms of a hydrocarbon by halogen atoms, is difficultly decomposable and highly stable and will not decompose for a long period of time after being discharged to the atmosphere, after which the chloro-fluorocarbon will reach an ozone layer located 25–30 Km above the earth and meet with the intense ultraviolet rays emitted from the sun so as to liberate the chlorine atoms which then react with the ozone to reduce the ozone concentration in the ozone layer. The ozone layer absorbs the harmful ultraviolet rays emitted from the sun to protect the life on the surface of the earth. Thus, an international treaty which controls the production and consumption of CFCs and HCFC-22, has been proposed to be concluded in order to prevent the destruction of the ozone layer by CFCs and HCFC-22.

Under such circumstances, the U.S. Environmental Protection Agency (EPA) has proposed six kinds of substitute refrigerants which are 1,1-dichloro-2,2,2-trifluoroethane (HCFC-123), 1-chloro-1,2,2,2-tetrafluoroethane (HCFC-124), 1,2-dichloro-2,2-difluoroethane (HCFC-132b), 1-chloro-2,2,2-trifluoroethane (HFC-133a), 1,1,1,2-tetrafluoroethane (HFC-134a) and 1,1-dichloro-1-fluoroethane (HCFC-141b).

Among these substitute refrigerants, 1,1,1,2-tetrafluoroethane is similar in thermodynamic properties to dichlorodifluoromethane (CFC-12) which has heretofore been widely used in home refrigerators and air-conditioners as well as in car air-conditioners. If, therefore, 1,1,1,2tetrafluoroethane (HFC-134a) is to be used as the refrigerant, then refrigerator systems using this refrigerant therein may be established without a great change in design to obtain the same refrigeration performances as conventional systems.

It is to be noted, however, that a refrigerator oil composition filled in the compressor of a refrigerator is entrained into the condenser and evaporator thereof and, therefore, it is indispensable that the oil composition be a so-called "well-returnable" oil which is fully soluble in the reflux refrigerant, circulated through the cycle and returned to the compressor.

More specifically, it is not unusual that the temperature reaches $-20°$ to $-30°$ C. at the coolest portion extending from the expansion valve or capillary tube to the evaporator within the refrigeration cycle, and, therefore, a preferable refrigerator oil composition is such that when mixed with the refrigerant, it will not separate from the refrigerant and will not form two separate layers at such a low temperature.

Further, it is not unusual that the temperature reaches a high temperature at the portion extending from the compressor to the receiver or condenser, and, therefore, a more preferable refrigerator oil composition is such that when mixed with the refrigerant, it will not separate from the refrigerant not to form two separate layers not only at the low temperature but also at a high temperature.

The refrigerator oil compositions heretofore generally used include naphthenic mineral oils, paraffinic mineral oils, alkylbenzenes and mixtures thereof as well as these base oils incorporated with suitable additives. These conventional refrigerator oil compositions are described in, for example, Japanese Pat. Gazettes Nos. Sho. 40-11940, Sho. 49-4107, Sho. 49-13483, Sho. 49-13829, Sho. 49-19084, Sho. 52-39509, Sho. 52-43722 and Sho. 53-17602, as well as Japanese Pat. Appln. Laid-Open Gazettes Nos. sho. 46-4532, sho. 48-606, sho. 49-47498, sho. 51-22971, Sho. 52-28503, sho. 52-54707 and sho. 53-88007. These conventional refrigerator oil compositions are hardly compatible with 1,1,1,2-tetrafluoroethane (HFC-134a) which is a substitute refrigerant for dichlorodifluoromethane (CFC-12). For this reason, if the conventional oil compositions are used in combination with 1,1,1,2-tetrafluoroethane then the resulting mixture will separate into two layers at normal temperature thus degrading the oil-returnability which is most important within the refrigeration system, with the result that there are caused various troubles such as a decrease in refrigeration efficiency, the deterioration of lubricity and the consequent seizure of compressor whereby the oil compositions are made unsuitable for use as such. In addition, refrigerator oil compositions comprising polyglycolic oils are also known for their high viscosity index and are disclosed in, for example, Japanese Pat. Gazettes Nos. Sho. 57-42119 and Sho. 61-52880 and Japanese Pat. Appln. Laid-Open Gazette No. Sho. 57-51795. However, the polyglycolic oils concretely disclosed in these prior arts are not fully compatible with 1,1,1,2-tetrafluoroethane thereby raising the same problems as above and rendering them unusable.

SUMMARY OF THE INVENTION

The present inventors made various intensive studies in attempts to develop lubricating oil compositions for compression-type refrigerators in which 1,1,1,2-tetrafluoroethane is used as the refrigerant and, as the result of their studies, they found that a refrigerator oil composition comprising, as the base oil, a polyglycolic oil having a limited structure and specific properties has excellent performances which is not obtainable with that comprising any other base oil. This invention is based on this finding.

The primary object of this invention is to provide a refrigerator oil composition which is adapted for use in a compression-type refrigerator using therein 1,1,1,2-tetrafluoroethane as the refrigerant and which does not separate from the refrigerant especially at low temperatures during its use and has satisfactory sealability and stability.

The refrigerator oil composition of this invention comprises as the base oil polyoxyalkylene glycol monoethers represented by the following general formula

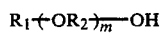

wherein $R_1$ is an alkyl group having 1–18 carbon atoms, m is an integer of 5–70, $R_2$ is an alkylene group having 2–4 carbon atoms and a ratio "$\alpha$" of (No. of $-OR_2-$ group wherein $R_2$ is ethylene group)/m in the molecule is 0–0.8, the polyoxyalkylene glycol monoether having a pour point of up to $-10°$ C. and a kinematic viscosity of 2–110 cSt at 100° C.

This invention will be explained in more detail hereunder.

The base oils for the refrigerator oil compositions of this invention are polyoxyalkylene glycol monoethers represented by the following general formula

wherein $R_1$ is a straight- or branched-chain alkyl group having 1 to 18 carbon atoms, m is an integer of 5 to 70, and $R_2$ is an alkylene group having 2 to 4 carbon atoms. $R_1$ includes methyl, ethyl, propyl, butyl, pentyl, hexyl, heptyl, octyl, nonyl, decyl, undecyl, dodecyl, tridecyl, tetradecyl, pentadecyl, hexadecyl, heptadecyl or octadecyl group, among which methyl, ethyl, propyl, butyl, pentyl, hexyl, octyl, decyl or octadecyl group is preferred.

$R_2$ includes ethylene group ($-CH_2CH_2-$), propylene group ($-\underset{\underset{CH_3}{|}}{C}HCH_2-$), trimethylene group ($-CH_2CH_2CH_2-$), butylene group ($-\underset{\underset{CH_2CH_3}{|}}{C}HCH_2-$)

-continued 1,2-dimethylethylene group ($-\underset{\underset{CH_3}{|}}{C}H-\underset{\underset{CH_3}{|}}{C}H-$), 1-methyltrimethylene group ($-\underset{\underset{CH_3}{|}}{C}HCH_2CH_2-$), 2-methyltrimethylene group ($-CH_2\underset{\underset{CH_3}{|}}{C}HCH_2-$) or tetramethylene group ($-CH_2CH_2CH_2CH_2-$), among which ethylene, propylene, butylene or tetramethylene group is more preferred. The polyoxyalkylene glycol monoether used in this invention may contain in the molecule alkylene groups respectively having different numbers of carbon atoms or may contain a random copolymer or block copolymer prepared from oxyalkylene groups respectively having different numbers of carbon atoms, but it is necessary that a ratio (a) of (No. of $-OR_2-$ group wherein $R_2$ is ethylene group)/m in the molecule be in the range of 0 to 0.8. In a case where the ratio ($\alpha$) exceeds 0.8, a refrigerator oil composition containing such a polyoxyalkylene glycol monoether as the base oil undesirably becomes solid at normal temperature or disadvantageously has a too high pour point.

It is necessary that the polyoxyalkylene glycol monoether used herein have a pour point of up to $-10°$ C., preferably $-20°$ to $-50°$ C. In a case where the pour point exceeds $-10°$ C., a refrigerator oil composition comprising such a polyoxyalkylene glycol monoether is undesirably likely to solidify within the refrigeration system.

It is also necessary that the polyoxyalkylene glycol monoether have a kinematic viscosity of 2–110 cSt at 100° C. In a case where the kinematic viscosity at 100° C. is less than 2 cSt, a refrigerator oil composition comprising such a monoether will not be able to keep the sealability of the compressor when used, while in a case where the kinematic viscosity at 100° C. exceeds 110 cSt, the refrigerator oil composition and 1,1,1,2-tetrafluoroethane refrigerant are poor in mutual solubility whereby these two are undesirably separated into their respective layers at low temperatures. In a case where the refrigerator oil composition of this invention is intended to be used in freeze-refrigeration apparatuses, the polyoxyalkylene glycol monoether should have a kinematic viscosity of preferably $2-(10+120\alpha)$ cSt, more preferably $3-(7+120\alpha)$ cSt, at 100° C. In a case where the refrigerator oil composition of this invention is intended to be used in car air-conditioners, the polyoxyalkylene glycol monoether should have a kinematic viscosity of preferably $5-(30+100\alpha)$ cSt, more preferably $8-(30+100\alpha)$ cSt, at 100° C.

Further, the polyoxyalkylene glycol monoether according to this invention has a number average molecular weight of preferably 300–4000, more preferably 500–3500, to improve the compressor in sealability. Furthermore, the monoether has a number average molecular weight of still more preferably 500–1500 to additionally attain a rise in temperature at which the two layers (oil composition and refrigerant) are separated from each other (this temperature being hereinafter referred to as "two-layer separation temperature") at a high temperature.

Still further, the polyoxyalkylene glycol monoether having a ratio (Mw/Mn) of 1.00 to 1.20 between the weight average molecular weight (Mw) and the number average molecular weight (Mn) is preferable from the standpoint that this monoether has a rise in two-layer separation temperature.

Further, among compounds generally called polyglycolic oils, there are polyoxyalkylene glycols wherein both the terminal hydroxyl groups in the molecule are not etherified, and polyoxyalkylene glycol diethers wherein both the terminal hydroxyl groups in the molecule are etherified, in addition to the polyoxyalkylene glycol monoethers according to this invention. These polyoxyalkylene glycol diethers are not fully compatible with a refrigerant, 1,1,1,2-tetrafluoroethane, and are practically not useful for the purpose of this invention; whereas said polyoxyalkylene glycols are approximately equal to polyoxyalkylene glycol monoethers according to this invention in compatibility with a refrigerant, 1,1,1,2-tetrafluoroethane, but they are inferior to the polyoxyalkylene glycol monoethers according to this invention in failure load obtained as the result in a FALEX test for evaluating load resistance which is important as one of the properties of the refrigerator oil composition of this invention and are also inferior to said monoethers according to this invention in viscosity index which indicates the temperature characteristics of kinematic viscosity. Thus, said polyoxyalkylene glycols are not preferable for use as a refrigerator oil composition.

The refrigerator oil composition of this invention comprising the polyoxyalkylene glycol monoether (which is the base oil) alone without any additives will exhibit excellent performances as such when used in refrigerators wherein 1,1,1,2-tetrafluoroethane is employed as the refrigerant, and, in order to further improve said oil composition in wear resistance and load resistance (failure-preventive property), it may preferably be incorporated with a phosphate represented by the general formula (A)

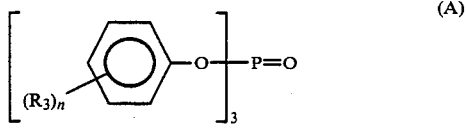

(A)

wherein $R_3$ is an alkyl group having 1-3 carbon atoms, preferably methyl group, and n is an integer of 0-2, preferably 0-1. $R_3$ is concretely illustrated by methyl, ethyl or propyl group.

The phosphate which is the component (A), preferably includes triphenyl phosphate, tritolyl phosphate (tricresyl phosphate) or a mixture thereof.

In a case where the refrigerator oil composition is intended to be further improved in wear resistance and load resistance with the use of the component (A), the component (A) may be added to the oil composition in an amount of 0.1-5.0, preferably 0.2-2.0, parts by weight per 100 parts by weight of the base oil of the oil composition. If the amount of the component (A) added is less than 0.1 part by weight then the oil composition so added will not be much improved in wear resistance and load resistance, while if the amount of the compound (A) added is more than 5.0 parts by weight then the oil composition will undesirably tend to degrade in heat stability and cause the corrosion of metals within the refrigeration system.

As mentioned above, the specific amount of the component (A) added will improve the oil composition in wear resistance and load resistance, but it will sometimes be likely to cause the corrosion of metals such as copper and copper alloys if such metals are used in piping within the refrigeration system.

Accordingly, in a case where the component (A) is added to the refrigerator oil composition, the thus added oil composition will preferably be enhanced in its overall performances by further incorporating it with at least one kind of an epoxy compound (B) selected from the group consisting of:

(B) (i) phenylglycidyl ether type epoxy compounds
(ii) epoxidized fatty acid monoesters and
(iii) epoxidized vegetable oils.

The said phenylglycidyl ether type epoxy compounds (i) include phenylglycidyl ether and alkylphenylglycidyl ethers. The said alkylphenylglycidyl ethers are those which have 1 to 3 alkyl groups having 1 to 13 carbon atoms, among which are preferred those having an alkyl group having 4 to 10 carbon atoms, such as butylphenylglycidyl ether, pentylphenylglycidyl ether, hexylphenylglycidyl ether, heptylphenylglycidyl ether, octylphenylglycidyl ether, nonylphenylglycidyl ether and decylphenylglycidyl ether.

The epoxidized fatty acid monoesters (ii) include esters of an epoxidized fatty acid having 12 to 20 carbon atoms and an alcohol having 1 to 8 carbon atoms, phenol or an alkylphenol. In particular, butyl, hexyl, benzyl, cyclohexyl, methoxyethyl, octyl, phenyl or butylphenyl esters of epoxidized stearic acid may preferably be used.

The epoxidized vegetable oils (iii) include epoxidized compounds of vegetable oils such as soybean oil, linseed oil and cottonseed oil.

Among these epoxy compounds (i) to (iii), the preferable components (B) include phenylglycidyl ether type epoxy compounds and epoxidized fatty acid monoesters with the former being more preferable. The most preferred are phenylglycidyl ether, butylphenylglycidyl ether and mixtures thereof.

In a case where the component (B), in addition to the component (A), is added to the refrigerator oil composition, the component (B) may be added thereto in an amount of 0.1-5.0, preferably 0.2-2.0 parts by weight per 100 parts by weight of the base oil of the oil composition. The addition of the component (B) in an amount of less than 0.1 part by weight will be poorly effective in enhancing the oil composition in metal corrosion prevention, while that in an amount of more than 5.0 parts by weight will undesirably have adverse effects on the wear resistance and load resistance of the oil composition.

To further enhance the refrigerator oil composition of this invention in performances, the oil composition may be incorporated, as required, with heretofore known additives for a refrigerator oil, which include phenol-type antioxidants such as di-tert.-butyl-p-cresol; amine-type antioxidants such as phenyl-α-naphthylamine and N,N'-di(2-naphthyl)-p-phenylenediamine; load resistant additives such as zinc dithiophosphate, chlorinated paraffin, fatty acids and sulfur type load resistant compounds; silicone-type antifoaming agents; metal inactivators such as benzotriazole; and hydrogen chloride captors such as glycidyl methacrylate and phosphite esters. These additives may be used singly or jointly.

The refrigerator oil composition of this invention for use in refrigerators using therein 1,1,1,2-tetrafluoroethane as the refrigerant, may preferably be used in refrigerators having a rotary compressor and may also be used in refrigerators having a reciprocating or centrifugal compressor. Especially, the oil composition of this invention may suitably be used in freeze-refrigeration apparatuses such as refrigerators, freezers, freeze and refrigeration warehouses, automatic vending machines, showcases, cooling units in chemical plants and dehumidifiers as well as in car air-conditioners.

This invention will be better understood by the following Examples and Comparative Examples.

EXAMPLES 1-17 AND COMPARATIVE EXAMPLES 1-5

The properties of the base oils used in the Examples and Comparative Examples are indicated in Table 1.

To measure the low-temperature separability of the refrigerator oil composition (consisting only of the base oil) of each of Examples 1-17 from a refrigerant, 1,1,1,2-tetrafluoroethane (refrigerant) was incorporated with each of 10, 20, 30, 40, 50 and 70 parts by weight of each of the refrigerator oil compositions of Examples 1-17 to obtain mixed liquids of the refrigerant and oil composition, after which each of the thus obtained mixed liquids was then slowly cooled from room temperature down to a temperature at which the mixed liquid was made white-turbid or separated into two layers, this temperature being defined as a two-layer separation temperature on the low temperature side. In a case where the mixed liquids were already white-turbid or had already been separated into two layers at room temperature, they were slowly heated to a temperature at which the white-turbidity or the separation was not appreciated, this temperature being also defined as a two-layer separation temperature on the low temperature side. The results are indicated in Table 2.

To measure the high-temperature separability of the refrigerator oil composition (consisting only of the base oil) of each of Examples 1-17 from a refrigerant, the same refrigerant as the above was incorporated with each of 3, 10 and 30 parts by weight of each of the refrigerator oil compositions of Examples 1-17 to obtain mixed liquids which were each slowly heated from room temperature up to a temperature at which the mixed liquid was made white-turbid or separated into two layers, this temperature being defined as a two-layer separation temperature on the high temperature side. In a case where the mixed liquids were already white-turbid or had already been separated into two layers at room temperature, they were slowly cooled to a temperature at which the white-turbidity or the separation was not appreciated, this temperature being also defined as a two-layer separation temperature on the high temperature side. The results are shown in Table 2.

For comparison, the refrigerator oil composition (consisting only of the base oil which is not covered by this invention) of each of Comparative Examples 1-5 was measured for a two-layer separation temperature on the low temperature side in the same manner as in Examples 1-17. The results are also indicated in Table 2.

EXAMPLES 18-27 AND COMPARATIVE EXAMPLE 6

There were prepared various refrigerator oil compositions of Examples 18-27 and Comparative Example 6 respectively having the constituents indicated in Table 3. Examples 18-22 correspond to the following claim 1, Examples 23 and 24 correspond to the following claim 2, Examples 25-27 correspond to the following claim 3 and Comparative Example 6 is not covered by this invention.

The refrigerator oil compositions so prepared were evaluated for their performances by the use of the following tests, and the results are also indicated in Table 3.

Falex test

The refrigerator oil compositions were each tested for failure load under the test conditions of an initial oil temperature of 25° C., run-in 250 (b and 5 minutes in accordance with ASTM D 3233.

Sealed tube test

Mixtures of the refrigerator oil composition and a refrigerant (1,1,1,2-tetrafluoroethane) in equal volumes were sealed, together with copper and iron catalysts, in a glass tube and heated to 175° C. for 1000 hours to observe discoloration of the refrigerator oil composition and the catalysts and determine the degree of discoloration.

In the discoloration of the refrigerator oil composition, the degree of discoloration was classified into 12 grades ranging from 0 (colorless) to 11 (black-brown color). Further, in the discoloration of metal catalysts, there is raised no problem if the discoloration is such that they lost their luster, but it is unacceptable if the iron catalyst was plated with the copper.

TABLE 1

| Examples Comparative Examples | Base oil | Composition | | | | Pour point[1] (°C.) | Kinematic viscosity[2] (@ 100° C., cSt) | Viscosity index[2] |
|---|---|---|---|---|---|---|---|---|
| | | $m^3$ | $Mn^4$ | $Mw/Mn^5$ | $\alpha^6$ | | | |
| Example 1 | Polyoxypropylene glycol monobutyl ether 1 | 11 | 700 | 1.09 | 0 | −47 | 6.7 | 170 |
| Example 2 | Polyoxyethyleneoxypropylene glycol monobutyl ether 1 | 9 | 506 | 1.09 | 0.5 | −52 | 5.0 | 168 |
| Example 3 | Polyoxyethyleneoxypropylene glycol monobutyl ether 2 | 19 | 994 | 1.10 | 0.5 | −45 | 10.7 | 210 |
| Example 4 | Polyoxyethyleneoxypropylene glycol monobutyl ether 3 | 28 | 1480 | 1.10 | 0.5 | −40 | 18.4 | 219 |
| Example 5 | Polyoxypropylene glycol monoethyl ether | 17 | 1000 | 1.09 | 0 | −47 | 10.0 | 207 |
| Example 6 | Polyoxyethyleneoxypropylene glycol monobutyl ether 4 | 19 | 1000 | 1.10 | 0.5 | −45 | 10.8 | 211 |
| Example 7 | Polyoxypropylene glycol monopropyl ether | 17 | 1000 | 1.10 | 0 | −47 | 10.0 | 206 |
| Example 8 | Polyoxyethyleneoxypropylene | 17 | 1000 | 1.10 | 0.5 | −48 | 10.1 | 206 |

TABLE 1-continued

| Examples Comparative Examples | Base oil | Composition m[3] | Mn[4] | Mw/Mn[5] | α[6] | Pour point[1] (°C.) | Kinematic viscosity[2] (@ 100° C., cSt) | Viscosity index[2] |
|---|---|---|---|---|---|---|---|---|
| | glycol monopropyl ether | | | | | | | |
| Example 9 | Polyoxyethyleneoxypropylene glycol monoethyl/butyl ether | 17 | 1000 | 1.11 | 0.5 | −45 | 10.7 | 209 |
| Example 10 | Polyoxyethyleneoxypropylene glycol monobutyl ether 5 | 37 | 2000 | 1.09 | 0.5 | −28 | 25.7 | 210 |
| Example 11 | Polyoxyethyleneoxypropylene glycol monobutyl ether 6 | 57 | 3000 | 1.11 | 0.5 | −22 | 69.5 | 260 |
| Example 12 | Polyoxyethyleneoxypropylene glycol monobutyl ether 7 | 70 | 3500 | 1.10 | 0.75 | −20 | 100 | 270 |
| Example 13 | Polyoxyethyleneoxytetramethylene glycol monobutyl ether | 36 | 2200 | 1.10 | 0.5 | −32 | 30.1 | 220 |
| Example 14 | Polyoxyethyleneoxypropylene glycol monobutyl ether 8 | 19 | 1000 | 1.30 | 0.5 | −45 | 10.8 | 211 |
| Example 15 | Polyoxypropylene glycol monomethyl ether | 17 | 1000 | 1.35 | 0 | −47 | 10.0 | 206 |
| Example 16 | Example 2 (50 parts by weight) + Example 4 (50 parts by weight) | 18 | 996 | 1.44 | 0.5 | −46 | 9.6 | 202 |
| Example 17 | Example 3 (50 parts by weight) + Example 10 (50 parts by weight) | 28 | 1500 | 1.23 | 0.5 | −40 | 16.1 | 217 |
| Comp. Ex. 1 | Refined paraffinic mineral oil | | | — | | −25 | 6.5 | 95 |
| Comp. Ex. 2 | Refined naphthenic mineral oil | | | — | | −25 | 6.2 | 48 |
| Comp. Ex. 3 | Alkylbenzene | Prepared by alkylation of benzene by the use of propylene oligomer, Average molecular weight 420 | | | | −40 | 6.6 | 5 |
| Comp. Ex. 4 | Polyoxypropylene glycol dioctadecyl ether | 35 | 2500 | 1.10 | 0 | −35 | 40.8 | 220 |
| Comp. Ex. 5 | Polyoxypropylene glycol | 17 | 1000 | 1.11 | 0 | −40 | 10.6 | 140 |

[1]Measured in accordance with JIS K2269
[2]Measured in accordance with JIS K2283
[3]Number of —OR$_2$— group, Average value
[4]Number average molecular weight
[5]Weight average molecular weight/Number average molecular weight
[6](Number of —OCH$_2$CH$_2$— group)/m, Average value

TABLE 2

| Examples Comparative Examples | Base oil | Two-layer separation temperature (°C.) On low temperature side Base oil concentration in refrigerant (Base oil/1,1,1,2-tetrafluoroethane, Parts by weight) | | | | | | On high temperature side | | |
|---|---|---|---|---|---|---|---|---|---|---|
| | | 10 | 20 | 30 | 40 | 50 | 70 | 3 | 10 | 30 |
| Example 1 | Polyoxypropylene glycol monobutyl ether 1 | <−70 | <−70 | <−70 | <−70 | <−70 | <−70 | >90 | >90 | >90 |
| Example 2 | Polyoxyethyleneoxypropylene glycol monobutyl ether 1 | <−70 | <−70 | <−70 | <−70 | <−70 | <−70 | >90 | >90 | >90 |
| Example 3 | Polyoxyethyleneoxypropylene glycol monobutyl ether 2 | <−70 | <−70 | <−70 | <−70 | <−70 | <−70 | 90 | 85 | 90 |
| Example 4 | Polyoxyethyleneoxypropylene glycol monobutyl ether 3 | <−70 | <−70 | <−70 | <−70 | <−70 | <−70 | 80 | 80 | 85 |
| Example 5 | Polyoxypropylene glycol monoethyl ether | <−70 | <−70 | <−70 | <−70 | <−70 | <−70 | 85 | 85 | 90 |
| Example 6 | Polyoxyethyleneoxypropylene glycol monobutyl ether 4 | <−70 | <−70 | <−70 | <−70 | <−70 | <−70 | 85 | 85 | 90 |
| Example 7 | Polyoxypropylene glycol monopropyl ether | <−70 | <−70 | <−70 | <−70 | <−70 | <−70 | 90 | 85 | 90 |
| Example 8 | Polyoxyethyleneoxypropylene glycol monopropyl ether | <−70 | <−70 | <−70 | <−70 | <−70 | <−70 | 85 | 85 | 90 |
| Example 9 | Polyoxyethyleneoxypropylene glycol monoethyl/butyl ether | <−70 | <−70 | <−70 | <−70 | <−70 | <−70 | 85 | 85 | 90 |
| Example 10 | Polyoxyethyleneoxypropylene glycol monobutyl ether 5 | <−70 | <−70 | <−70 | <−70 | <−70 | <−70 | 45 | 40 | 50 |
| Example 11 | Polyoxyethyleneoxypropylene glycol monobutyl ether 6 | <−70 | <−70 | <−70 | <−70 | <−70 | <−70 | 30 | 25 | 40 |
| Example 12 | Polyoxyethyleneoxypropylene glycol monobutyl ether 7 | −60 | <−70 | <−70 | <−70 | <−70 | <−70 | 20 | 15 | 25 |
| Example 13 | Polyoxyethyleneoxytetramethylene glycol monobutyl ether | <−70 | <−70 | <−70 | <−70 | <−70 | <−70 | 42 | 38 | 45 |
| Example 14 | Polyoxyethyleneoxypropylene glycol monobutyl ether 8 | <−70 | <−70 | <−70 | <−70 | <−70 | <−70 | 70 | 65 | 70 |
| Example 15 | Polyoxypropylene glycol monomethyl ether | <−70 | <−70 | <−70 | <−70 | <−70 | <−70 | 70 | 65 | 80 |
| Example 16 | Example 2 (50 parts by weight) + Example 4 (50 parts by weight) | <−70 | <−70 | <−70 | <−70 | <−70 | <−70 | 75 | 70 | 75 |
| Example 17 | Example 3 (50 parts by weight) + Example 10 (50 parts by weight) | <−70 | <−70 | <−70 | <−70 | <−70 | <−70 | 75 | 70 | 70 |
| Comp. Ex. 1 | Refined paraffinic mineral oil | >30 | >30 | >30 | >30 | >30 | >30 | — | — | — |

TABLE 2-continued

| Examples Comparative Examples | Base oil | Two-layer separation temperature (°C.) | | | | | | | | |
|---|---|---|---|---|---|---|---|---|---|---|
| | | On low temperature side | | | | | | On high temperature side | | |
| | | Base oil concentration in refrigerant (Base oil/1,1,1,2-tetrafluoroethane, Parts by weight) | | | | | | | | |
| | | 10 | 20 | 30 | 40 | 50 | 70 | 3 | 10 | 30 |
| Comp. Ex. 2 | Refined naphthenic mineral oil | >30 | >30 | >30 | >30 | >30 | >30 | — | — | — |
| Comp. Ex. 3 | Alkylbenzene | >30 | >30 | >30 | >30 | >30 | >30 | — | — | — |
| Comp. Ex. 4 | Polyoxypropylene glycol dioctadecyl ether | >30 | >30 | >30 | >30 | >30 | >30 | — | — | — |
| Comp. Ex. 5 | Polyoxypropylene glycol | <−70 | <−70 | <−70 | <−70 | <−70 | <−70 | 80 | 85 | 85 |

TABLE 3

| Examples Comp. Ex. | Composition [Parts by weight] | | | Evaluation test for performance | | |
|---|---|---|---|---|---|---|
| | | | | | Sealed tube test | |
| | Base oil | Component (A) | Component (B) | FALEX test failure load (lb) | Test oil appearance (color) | Catalyst appearance |
| Example 18 | Polyoxypropylene glycol monobutyl ether 1 [100] | — | — | 500 | 1 | Luster decreased |
| Example 19 | Polyoxyethyleneoxypropylene glycol monobutyl ether 1 [100] | — | — | 550 | 1 | Luster decreased |
| Example 20 | Polyoxyethyleneoxypropylene glycol monobutyl ether 2 [100] | — | — | 600 | 1 | Luster decreased |
| Example 21 | Polyoxyethyleneoxypropylene glycol monobutyl ether 3 [100] | — | — | 650 | 1 | Luster decreased |
| Example 22 | Polyoxyethyleneoxytetramethylene glycol monobutyl ether [100] | — | — | 600 | 1 | Luster decreased |
| Example 23 | Polyoxypropylene glycol monobutyl ether 1 [100] | Tricresyl phosphate [1.0] | — | 1150 | 2 | Luster decreased |
| Example 24 | Polyoxyethyleneoxypropylene glycol monobutyl ether 1 [100] | Triphenyl phosphate [1.0] | — | 1200 | 2 | Luster decreased |
| Example 25 | Polyoxyethyleneoxypropylene glycol monobutyl ether 2 [100] | Tricresyl phosphate [1.0] | Phenylglycidyl ether [1.0] | 1100 | 0 | No change |
| Example 26 | Polyoxyethyleneoxypropylene glycol monobutyl ether 3 [100] | Tricresyl phosphate [1.0] | Butylphenylglycidyl ether [1.0] | 1150 | 0 | No change |
| Example 27 | Polyoxyethyleneoxytetramethylene glycol monobutyl ether [100] | Triphenyl phosphate [1.0] | Octylepoxystearate [1.0] | 1100 | 0 | No change |
| Comp. Ex. 6 | Polyoxypropylene glycol [100] | — | — | 400 | 1 | Luster decreased |

It is apparent from the results of two-layer separation temperatures in Table 2 that the refrigerator oil compositions of Examples 1-17 are very satisfactorily compatible with 1,1,1,2-tetrafluoroethane (refrigerant) even at a low temperature such as about −20° C. to −30° C. In contrast, the mineral oils and alkylbenzene of Comparative Examples 1-3 as well as the diether (even if a polyglycolic oil) of Comparative Example 4, separated from the refrigerant even at a normal temperature to form two layers thereby rendering them unusable. In addition, the polyoxypropylene glycol of Comparative Example 5 is equal in compatibility with a refrigerant to the refrigerator oil compositions of Examples 1-17, but the former is inferior in viscosity index to the latter as is apparent from Table 1.

On the other hand, the refrigerator oil compositions (Examples 1-9) in each of which was used, as the base oil, a polyoxyalkylene glycol monoether having a Mn of 500-1500 and a ratio (Mw/Mn) of 1.00-1.20 between Mw and Mn, exhibited very satisfactory compatibility with said refrigerant even at a high temperature of about 60°-80° C.

It is apparent from the results of evaluation tests for performances in Table 3 that the polyoxypropylene glycol of Comparative Example 6 is inferior to the refrigerator oil compositions of Examples 18-27 in failure load which is the result obtained from the Falex test. Further, the refrigerator oil compositions of Examples 18-22 corresponding to the following claim 1 exhibited excellent performances in the Falex and Sealed tube tests and that the refrigerator oil compositions of Examples 23 and 24 corresponding to the following claim 2 were remarkably enhanced in failure load by adding the component (A) to the oil compositions and had better lubricity. Further, the refrigerator oil compositions of Examples 25-27 corresponding to the following claim 3, exhibited better results than those of Examples 23 and 24 in the Sealed tube test while retaining excellent lubricity. In particular, the refrigerator oil compositions cp,p of Examples 25-27 exhibited better results than those of Examples 18-22 in the Sealed tube test, this clearly indicating the effect of the component (B) on the stability of refrigerator oil compositions.

Effect of the Invention

As mentioned above, the refrigerator oil compositions of this invention are adapted for use in refrigerators in which 1,1,1,2-tetrafluoroethane is used as the refrigerant, do not separate from the refrigerant at low temperatures and are excellent in lubricity, sealability and stability.

In particular, the refrigerator oil compositions in which is used, as the base oil, a polyalkylene glycol monoether having a specific range of number average molecular weight and a specific ratio of weight average molecular weight to number average molecular weight, will not separate from the refrigerant at not only low temperatures but also high temperatures.

Accordingly, the refrigerator oil compositions of this invention may advantageously be used in refrigerators such as freeze-refrigeration apparatuses and car air-conditioners.

What is claimed is:

1. A lubricating oil composition for a refrigerator in which 1,1,1,2-tetrafluoroethane is used as the refrigerant, consisting essentially of the base oil a polyoxyalkylene glycol monoether represented by the general formula

$$R_1-(-OR_2-)_{m}OH$$

wherein $R_1$ is an alkyl group having 1-18 carbon atoms, m is an integer of 5-70, $R_2$ is an alkylene group having 2-4 carbon atoms and a ratio "α" of 0-0.8 between. (the number of $-OR_2-$ group wherein $R_2$ is ethylene group)/m in the molecule, the polyoxyalkylene glycol monoether having a pour point of up to $-10°$ C. and a kinematic viscosity of 2-110 cSt at 100° C., a number average molecular weight of 500-1500 and a ratio (Mw/Mn) of 1.0-1.20 between the weight average molecular weight (Mw) and the number average molecular weight (Mn).

2. A lubricating oil composition according to claim 1, wherein the refrigerator is a freeze-refrigeration apparatus or a car air-conditioner.

3. The composition according to claim 1 wherein said base oil is polyoxypropylene glycol monobutyl ether, polyoxyethyleneoxypropylene glycol monobutyl ether I, polyoxyethyleneoxypropylene glycol monobutyl ether 2, polyoxyethyleneoxypropylene glycol monobutyl ether 3, polyoxypropylene glycol monoethyl ether, polyoxyethyleneoxypropylene glycol monobutyl ether 4, polyoxypropylene glycol monopropyl ether, polyoxyethyleneoxypropylene glycol monopropyl ether, polyoxyethyleneoxypropylene glycol monoethyl/butyl ether, polyoxyethyleneoxypropylene glycol monobutyl ether 5, polyoxyethyleneoxypropylene glycol monobutyl ether 6, polyoxyethyleneoxypropylene glycol monobutyl ether 7, polyoxyethyleneoxytetramethylene glycol monobutyl ether, polyoxyethyleneoxypropylene glycol monobutyl ether 8, or polyoxypropylene glycol monomethyl ether.

4. A lubricating oil composition for a refrigerator in which 1,1,1,2-tetrafluoroethane is used as the refrigerant, consisting essentially of the base oil a polyoxyalkylene glycol monoether represented by the general formula $$R_1-(-OR_2-)_{m}OH$$

wherein $R_1$ is an alkyl group having 1-18 carbon atoms, m is an integer of 5-70, $R_2$ is an alkylene group having 2-4 carbon atoms and a ratio of 0-0.8 between (the number of $-OR_2-$ group wherein $R_2$ is ethylene group)/m in the molecule, the polyoxyalkylene glycol monoether having a pour point of up to $-10°$ C., a kinematic viscosity of 2-110 cSt at 100° C., a number average molecular weight of 500-1500 and a ratio (Mw/Mn) of 1.00-1.20 between the weight average molecular weight (Mw) and the number average molecular weight (Mn), further comprising:

(A) a phosphate represented by the general formula

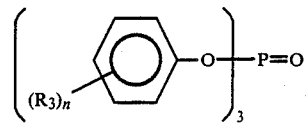

wherein $R_3$ is an alkyl having 1-3 carbon atoms and n is an integer of 0-2, in an amount of 0.1-5.0 parts by weight per 100 parts by weight of the base oil.

5. A lubricating oil composition according to claim 4, wherein the refrigerator is a freeze-refrigeration apparatus or a car air-conditioner.

6. A lubricating oil composition for a refrigerator in which 1,1,1,2-tetrafluoroethane is used as the refrigerant, consisting essentially of the base oil a polyoxyalkylene glycol monoether represented by the general formula

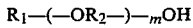
$$R_1-(-OR_2-)_{m}OH$$

wherein $R_1$ is an alkyl group having 1-18 carbon atoms, m is an integer of 5-70, $R_2$ is an alkylene group having 2-4 carbon atoms and a ratio of "α" if 0-0.8 between (the number of $-OR_2-$ group wherein $R_2$ is ethylene group)/m in the molecule, the polyoxyalkylene glycol monoether having a pour point of up to $-10°$ C., a kinematic viscosity of 2-110 cSt at 100° C., a number average molecular weight of 500-1500 and a ratio (Mw/Mn) of 1.00-1.20 between the weight average molecular weight (Mw) and the number average molecular weight (Mn), further comprising:

(A) a phosphate represented by the general formula

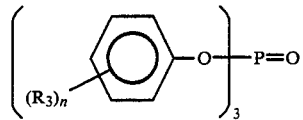

wherein $R_3$ is an alkyl group having 1-3 carbon atoms and n is an integer of 0-2, in an amount of 0.1-5.0 parts by weight per 100 parts by weight of the base oil and (B) at least one kind of an epoxy compound selected from the group consisting of
  (i) phenylglycidyl ether type epoxy compounds,
  (ii) epoxidized fatty acid monoesters and
  (iii) epoxidized vegetable oils, in an amount of 0.1-5.0 parts by weight per 100 parts by weight of the base oil.

7. A lubricating oil composition according to claim 6, wherein the refrigerator is a freeze-refrigeration apparatus or a car air-conditioner.

* * * * *